(12) United States Patent
Lan

(10) Patent No.: US 10,663,805 B2
(45) Date of Patent: May 26, 2020

(54) MATERIAL OF ALIGNMENT FILMS, METHODS OF FABRICATING LIQUID CRYSTAL DISPLAY PANELS AND LIQUID CRYSTAL DISPLAY PANELS

(71) Applicant: Shenzhen China Star Optoelectronics Technology Co., Ltd., Shenzhen (CN)

(72) Inventor: Song Lan, Shenzhen (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 87 days.

(21) Appl. No.: 16/197,293

(22) Filed: Nov. 20, 2018

(65) Prior Publication Data

US 2019/0086737 A1 Mar. 21, 2019

Related U.S. Application Data

(62) Division of application No. 15/116,225, filed on Aug. 3, 2016, now Pat. No. 10,168,580.

(30) Foreign Application Priority Data

Jun. 2, 2016 (CN) .......................... 2016 1 0388392

(51) Int. Cl.
*G02F 1/1337* (2006.01)
*C09K 19/56* (2006.01)

(52) U.S. Cl.
CPC ........ *G02F 1/133723* (2013.01); *C09K 19/56* (2013.01); *G02F 1/133788* (2013.01); *G02F 1/133711* (2013.01)

(58) Field of Classification Search
CPC ................................................ G02F 1/133723
See application file for complete search history.

(56) References Cited

U.S. PATENT DOCUMENTS

2011/0199566 A1* 8/2011 Mazusaki .......... C08G 73/1039
349/123
2014/0375940 A1* 12/2014 Zhong .................... C09K 19/56
349/123

* cited by examiner

*Primary Examiner* — Robert A Vetere
(74) *Attorney, Agent, or Firm* — Leong C. Lei

(57) ABSTRACT

A material of alignment film, a method of fabricating a liquid crystal display panel, and a liquid crystal display panel are provided. The material of alignment film is obtained by mixing a polymerizable monomer in the polyamic acid solution, thus is easy to fabricate. The method of fabricating the liquid crystal display panel obtains an alignment film including a polyimide film and polymer protrusions located on a surface of the polyimide film by coating the material of alignment film on a substrate, and going through a series of processes; the alignment film can allow liquid crystal molecules arrange in vertical alignment and generate a pre-inclination angle, and a risk of the polymerizable monomer contaminating the liquid crystal molecules does not exist, so as to enhance quality of the liquid crystal display panel. The liquid crystal display panel has a simple structure and good alignment effect, and has excellent display quality.

1 Claim, 6 Drawing Sheets

MATERIAL OF ALIGNMENT FILMS, METHODS OF FABRICATING LIQUID CRYSTAL DISPLAY PANELS AND LIQUID CRYSTAL DISPLAY PANELS

CROSS REFERENCE TO RELATED APPLICATIONS

This is a divisional application of co-pending U.S. patent application Ser. No. 15/116,225, filed on Aug. 3, 2016, which is a national stage of PCT Application No. PCT/CN2016/086537, filed on Jun. 21, 2016, claiming foreign priority of Chinese Patent Application No. 201610388392.2, filed on Jun. 2, 2016.

FIELD OF THE INVENTION

The present application relates to display technical field, especially to a material of alignment film, a method of fabricating a liquid crystal display panel, and a liquid crystal display panel.

BACKGROUND OF THE INVENTION

With the development of display technology, a liquid crystal display (LCD) device has many advantages of high definition, power saving, thin body, and wide application, so it is widely used in a variety of consumer electronic products such as mobile phones, televisions (TV), personal digital assistants, digital cameras, notebook computers, desktop computers etc., and becomes the main stream in the display devices.

Most of the liquid crystal devices in current market are the backlight type liquid crystal display, which includes a liquid crystal display panel and a backlight module. The working principle of the liquid crystal display panel is: placing liquid crystal molecules in two parallel glass substrates, which have many vertical and horizontal fine wires between the two glass substrates; controlling the liquid crystal molecules to change direction by energizing or not energizing; and refracting light of the backlight module to produce frames.

Generally, the liquid crystal display panel is consisting of a color filter (CF) substrate, a thin film transistor (TFT) substrate, liquid crystal (LC) interposed between the CF substrate and the TFT substrate, and a sealant.

In TFT-LCD, vertically aligned (VA) becomes a common mode of large-size TVs, with its advantages of wide viewing angle, high contrast, and no need of friction alignment. The VA techniques are mainly divided into multi-domain vertical alignment (MVA) technique, patterned vertical alignment (PVA) technique, and continuous pinwheel alignment (CPA) technique. Such the VA techniques all are needed to design protrusions or slits on the CF side, at the same time of increasing cost, light transmittance of the display screens are also reduced, to solve a problem of implementing a plane control of the CF side from the point or line control, a new VA display technique, called polymer stabilization vertical alignment (PSVA) technique, is produced.

The greatest feature of polymer stabilization vertical alignment technique is that a polymer layer, which can allow vertical alignment liquid crystal form a pre-inclination angle, is formed on the alignment film. Formation of this polymer film is shown in FIGS. 1A to 1D. As shown in FIG. 1A, a certain ratio of high purity reactive mesogen (RM) 200 is blended in liquid crystal molecules 100. This is a phototropism monomer containing a double bond. As shown in FIG. 1B, before ultraviolet (UV) irradiation, an external voltage is applied to an upper substrate 300 and a lower substrate 100 to allow the liquid crystal molecules generate a pre-inclination angle, and corresponding to different domains, inclination directions of the liquid crystal molecules 100 are different. As shown in FIG. 1C, after the pre-inclination angle is determined with the external voltage, specific UV irradiation is performed, and at this time, the reactive mesogen 200 polymerizes to form a polymer network 500 that attracts the liquid crystal molecules 100 to form a fixed pre-inclination angle. Aas shown in FIG. 1D, after the UV irradiation is completed and the external voltage is removed, the liquid crystal molecules 100 on surfaces of the upper substrate 300 and the lower substrate 400 still keep at the certain pre-inclination angle.

However, after the reactive mesogen undergoes free radical polymerization under the UV irradiation, there will be more or less reactive mesogen left in the liquid crystal and thus contaminating the liquid crystal, resulting in presence of ghost, and reducing quality of the panel.

SUMMARY OF THE INVENTION

A primary aspect of the present application is to provide a material of alignment film, which can simplify the liquid crystal alignment process, does not contaminate the liquid crystal, and enhances quality of liquid crystal display panel.

Another aspect of the present application is to provide a method of fabricating a liquid crystal display panel, which can achieve vertical alignment of the liquid crystal molecules and generate a pre-inclination angle thereof, a risk of the polymerizable monomer contaminating the liquid crystal molecules does not exist, and the quality of liquid crystal display panel is enhanced.

A further aspect of the present application is to provide a liquid crystal display panel, which has a simple structure and good alignment effect, and has excellent display quality.

To achieve the aforesaid aspects, the present application firstly provides a material of alignment film including a polyamic acid containing aromatic fused ring structure, a polymerizable monomer containing aromatic fused ring structure, and a solvent;

wherein the polyamic acid containing aromatic fused ring structure includes: one or more than one of the following:

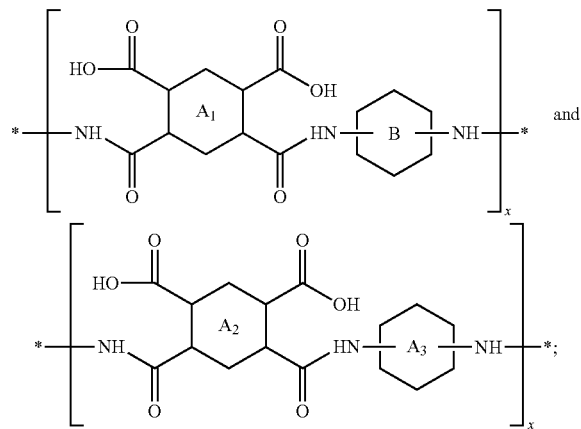

wherein

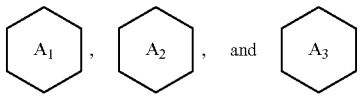

include one or a combination of more than one of

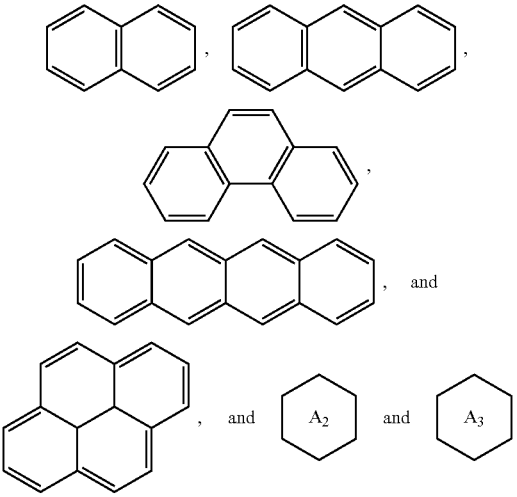

are the same or different;

is a non-aromatic fused ring based group containing a cyclic unit;

the polymerizable monomer containing aromatic fused ring structure includes one or more than one of the following:

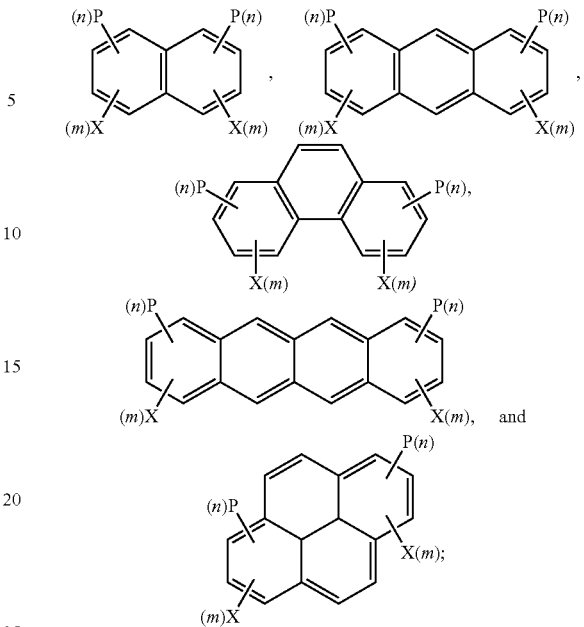

wherein P represents the polymerizable group, which is selected from at least one of methacrylate group, acrylate group, vinyl, ethyleneoxy, and epoxy; n is a number of the polymerizable group connecting to the same aromatic ring, n=1, 2 or 3, when n is greater than 1, the n polymerizable groups P are the same or different;

X represents a substituent, which is selected from at least one of —F, —Cl, —Br, methyl, —CN, straight or branched chain alkyl of 2-8 carbon atoms, and a group obtained by substituting one or more than one methyl in the alkyl with oxygen or sulfur atom; in is a number of the substituent X connecting to the same aromatic ring, m=1, 2 or 3, when in is greater than 1, the in substituents X are the same or different.

A mass percentage of the polyamic acid containing aromatic fused ring structure is 3-4%, a mass percentage of the polymerizable monomer containing aromatic fused ring structure is 0.03-0.4%, a mass percentage of the solvent is 95.6-96.97%.

The polyamic acid containing aromatic fused ring structure includes

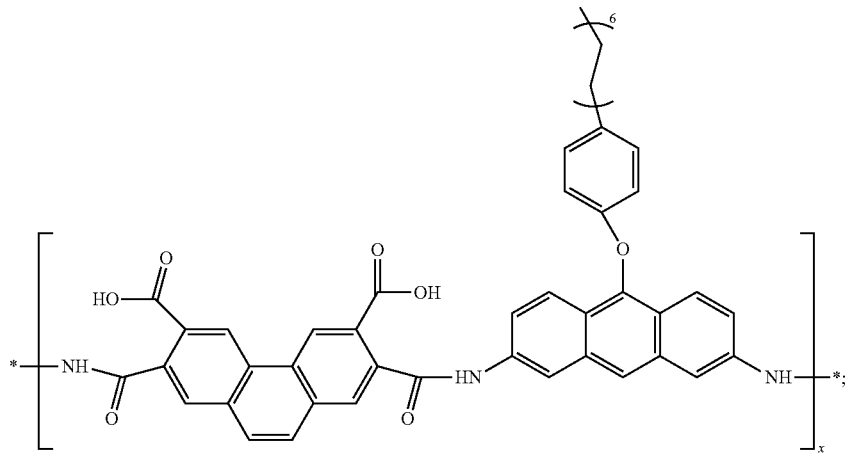

wherein the polymerizable monomer containing aromatic fused ring structure includes

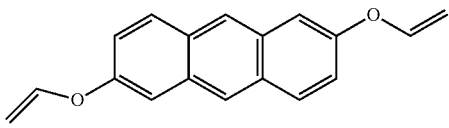

The present application further provides a method of fabricating a liquid crystal display panel, comprising the following steps:

Step 1, providing a material of alignment film, a material of alignment film including a polyamic acid containing aromatic fused ring structure, a polymerizable monomer containing aromatic fused ring structure, and a solvent;

wherein the polyamic acid containing aromatic fused ring structure includes one or more than one of the following:

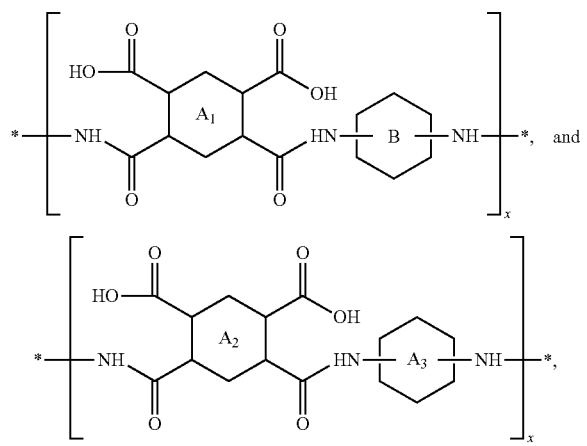

wherein

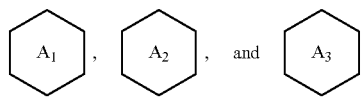

include one or a combination of more than one of

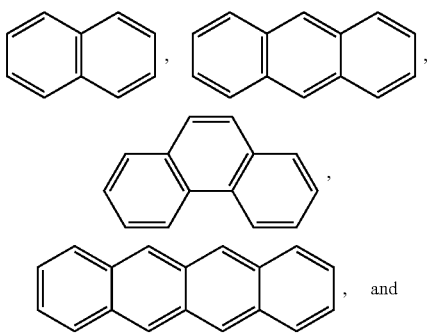

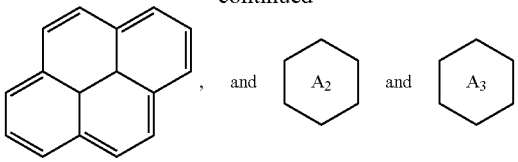

are the same or different;

is a non-aromatic fused ring based group containing cyclic unit;

the polymerizable monomer containing aromatic fused ring structure includes one or more than one of the following:

wherein P represents the polymerizable group, which is selected from at least one of methacrylate group, acrylate group, vinyl, ethyleneoxy, and epoxy; n is a number of the polymerizable group connecting to the same aromatic ring, n=1, 2 or 3, when n is greater than 1, the n polymerizable groups P are the same or different;

X represents a substituent, which is selected from at least one of —F, —Cl, —Br, methyl, —CN, straight or branched chain alkyl of 2-8 carbon atoms, and a group obtained by substituting one or more than one methyl in the alkyl with oxygen or sulfur atom; m is a number of the substituent X connecting to the same aromatic ring, m=1, 2 or 3, when m is greater than 1, the m substituents X are the same or different;

Step 2, providing a first substrate and a second substrate, the first substrate including a first underlying substrate and a first electrode disposed on the first underlying substrate, the second substrate including a second underlying substrate and a second electrode disposed on the second underlying substrate;

coating the material of alignment film provided in Step 1 on a surface of the first electrode of the first substrate and a surface of the second electrode of the second substrate;

baking the material of alignment film, to completely volatilize the solvent, simultaneously to make dehydration and cyclization of the polyamic acid containing aromatic fused ring structure, then to be converted to a polyimide containing aromatic fused ring, to form a polyimide film, and the polyimide film containing a polymerizable monomer containing aromatic fused ring structure;

Step 3, dripping liquid crystal molecules on the surface of the first substrate or second substrate that the polyimide film is disposed thereon, coating a sealant on a periphery corresponding to the liquid crystal molecules on the side of the second substrate or first substrate that the polyimide film is disposed thereon;

Step 4, laminating the first substrate and the second substrate at corresponding position, so that a liquid crystal layer is formed by the liquid crystal molecules located between the first substrate and the second substrate; curing the sealant, at this time, the liquid crystal molecules arranging perpendicular to the first substrate and the second substrate;

Step 5, applying a voltage to both sides of the liquid crystal layer through the first electrode and the second electrode, after the liquid crystal molecules deflected, at the same time of applying the voltage, performing UV irradiation to the polyimide film, to form polymer protrusions on the surface of the polyimide film by polymerizing the polymerizable monomer containing aromatic fused ring structure by action of photo initiation, so that a first alignment film and a second alignment film are respectively formed on the surfaces of the first substrate and the second substrate, both the first alignment film and the second alignment film include the polyimide film and the polymer protrusions located on the surface of the polyimide film;

wherein after the UV irradiation is stopped and the voltage is removed, the liquid crystal molecules near surfaces of the first alignment film and the second alignment film generates a pre-inclination angle.

In the material of alignment film of Step 1, the polyamic acid containing aromatic fused ring structure includes and the polymerizable monomer containing aromatic fused ring structure includes

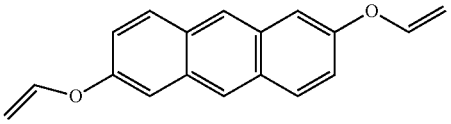

A mass percentage of the polyamic acid containing aromatic fused ring structure is 3-4%, a mass percentage of the polymerizable monomer containing aromatic fused ring structure is 0.03-0.4%, a mass percentage of the solvent is 95.6-96.97%.

The method of preparing the material of alignment film provided in Step 1 includes:

Step 11, providing a dianhydride based monomer containing aromatic fused ring structure and a diamine based monomer, dissolving the dianhydride based monomer containing aromatic fused ring structure and the diamine based monomer in the solvent, reacting to obtain the polyamic acid containing aromatic fused ring structure, so as to obtain a polyamic acid solution; and Step 12, providing a polymerizable monomer containing aromatic fused ring structure, adding the polymerizable monomer containing aromatic fused ring structure into the polyamic acid solution obtained in Step 11, to obtain the material of alignment film.

In Step 5, the voltage applied to the both sides of the liquid crystal layer is 13-25V, an intensity of ultraviolet (UV) during the UV irradiation is 85-100 mW/cm$^2$, an irradiation time is 20-30 min.

The present application further provides a liquid crystal display panel including: oppositely disposed a first substrate and a second substrate, a liquid crystal layer disposed between the first substrate and the second substrate, a first alignment film disposed on the first substrate near a side of the liquid crystal layer, and a second alignment film disposed on the second substrate near a side of the liquid crystal layer;

both the first alignment film and the second alignment film including a polyimide film and polymer protrusions located on a surface of the polyimide film;

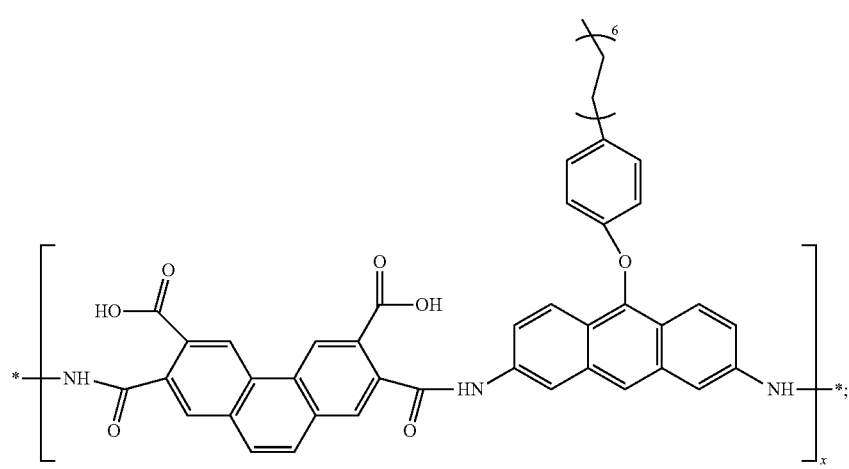

a material of the polyimide film including a polyimide containing aromatic fused ring structure, the polyimide containing aromatic fused ring structure including one or more than one of the followings:

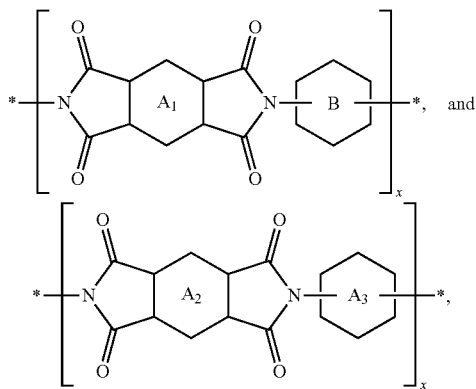

wherein x≥1;
wherein

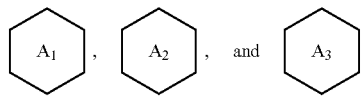

include one or a combination of more than one of

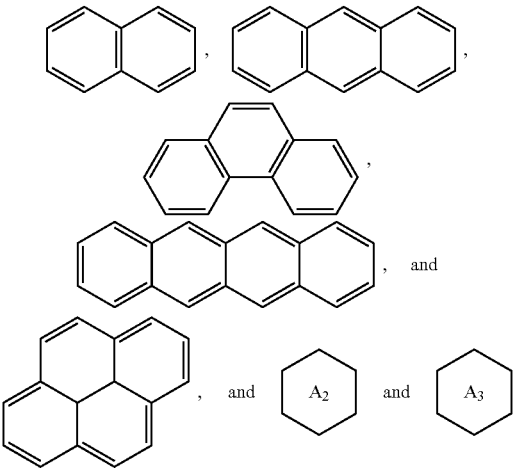

are the same or different;

is a non-aromatic fused ring based group containing cyclic unit;

the polymer protrusions are formed by polymerizing the polymerizable monomer containing aromatic fused ring structure, wherein the polymerizable monomer containing aromatic fused ring structure includes one or more than one of the following:

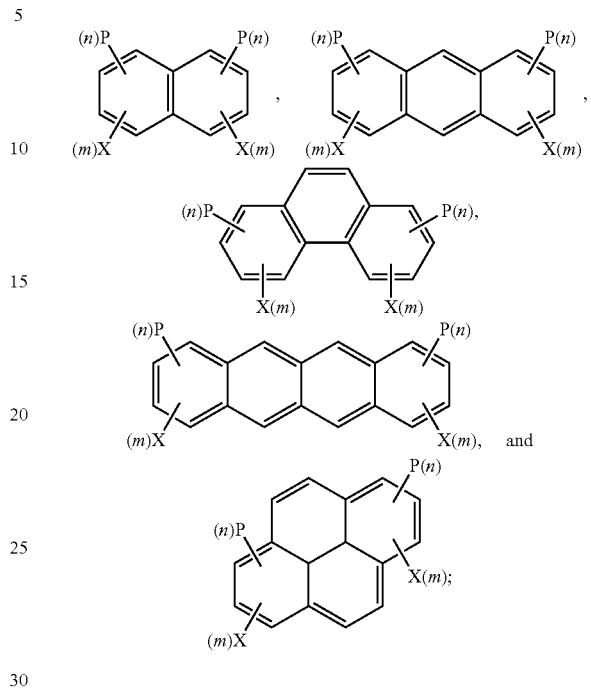

P represents a polymerizable group, which is selected from at least one of methacrylate group, acrylate group, vinyl, ethyleneoxy, and epoxy; n is a number of the polymerizable P connecting to the same aromatic ring, n=1, 2, or 3, when n is greater than 1, the n polymerizable groups P are the same or different;

X represents a substituent, which is selected from at least one of —F, —Cl, —Br, methyl, —CN, straight or branched chain alkyl of 2-8 carbon atoms, and a group obtained by substituting one or more than one methyl in the alkyl with oxygen or sulfur atom; in is a number of the substituent X connecting to the same aromatic ring, m=1, 2 or 3, when in is greater than 1, the in substituents X are the same or different.

The polyimide containing aromatic fused ring structure includes (e)

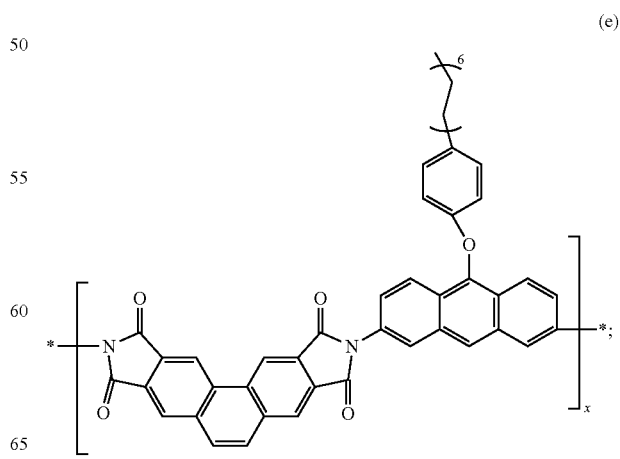

and the polymerizable monomer containing aromatic fused ring structure includes

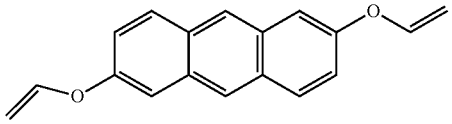

Advantages of the present application are as follows. The material of alignment film of the present application is obtained by mixing a polymerizable monomer in the polyamic acid solution, thus is easy to fabricate. The method of fabricating the liquid crystal display panel of the present application obtains an alignment film including a polyimide film and polymer protrusions located on a surface of the polyimide film by coating the material of alignment film on a substrate, and going through a series of processes. The alignment film can allow liquid crystal molecules arrange in vertical alignment and generate a pre-inclination angle. Risk of the polymerizable monomer contaminating the liquid crystal molecules does not exist, and quality of the liquid crystal display panel is enhanced. The liquid crystal display panel of the present application has a simple structure and good alignment effect, and has excellent display quality.

BRIEF DESCRIPTION OF THE DRAWINGS

The technical features and other advantages of the present application will become more readily apparent to those ordinarily skilled in the art, by referring the following detailed description of embodiments of the present application in conjunction with the accompanying drawings.

In the accompanying drawings.

DETAILED DESCRIPTION OF PREFERRED EMBODIMENTS

In order to further clarify the technical means adopted in the present application and the effects thereof, the preferable embodiments of the present application and the accompanying drawings thereof will be more specifically described as follows.

The present application firstly provides a material of alignment film including a polyamic acid containing aromatic fused ring structure, a polymerizable monomer containing aromatic fused ring structure, and a solvent;

wherein the polyamic acid containing aromatic fused ring structure including one or more than one of the following:

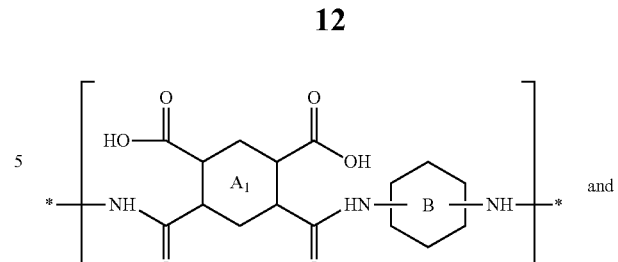

wherein x is 20-10000;

wherein

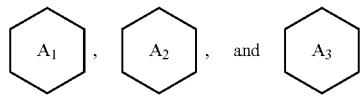

include one or a combination of more than one of

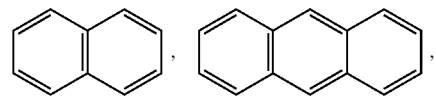

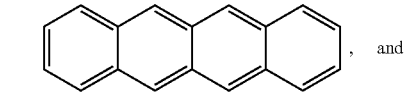

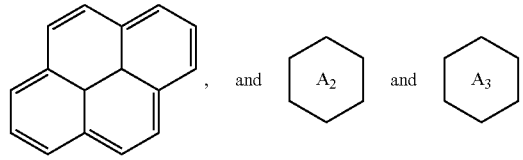

are the same or different;

is a non-aromatic fused ring based group containing a cyclic unit.

Specifically, the cyclic unit includes one or more than one in five-membered ring and six-membered ring; the six-membered ring includes one or more than one in aromatic ring and aliphatic ring.

Preferably,

includes one or a combination of more than one of

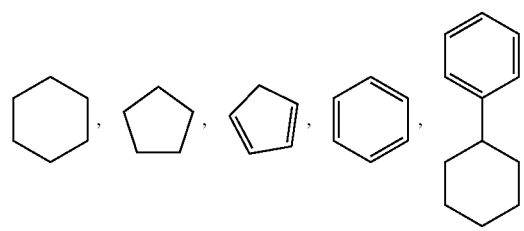

Preferably, the polyamic acid containing aromatic fused ring structure includes

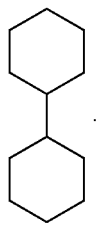

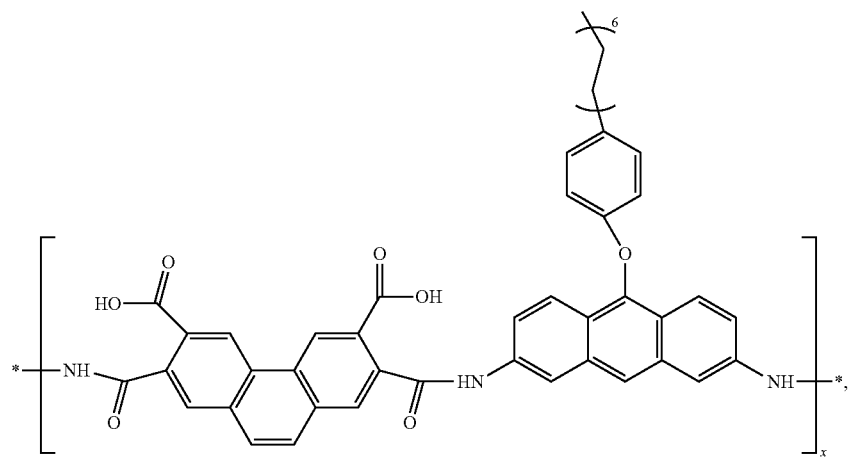

wherein x is 20-10000.

The polymerizable monomer containing aromatic fused ring structure includes one or more than one in

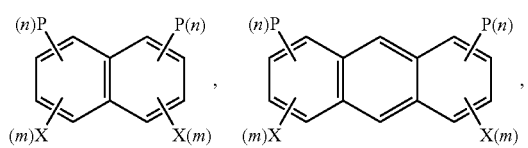

wherein P represents the polymerizable group, which is selected from at least one of methacrylate group, acrylate group, vinyl, ethyleneoxy, and epoxy; n is a number of the polymerizable group connecting to the same aromatic ring, n=1, 2 or 3, when n is greater than 1, the n polymerizable groups P are the same or different;

X represents a substituent, which is selected from at least one of —F, —Cl, —Br, methyl, —CN, straight or branched chain alkyl of 2-8 carbon atoms, and a group obtained by substituting one or more than one methyl in the alkyl with oxygen or sulfur atom; in is a number of the substituent X connecting to the same aromatic ring, m=1, 2 or 3, when in is greater than 1, the in substituents X are the same or different.

An ordinarily skilled person in the art can understand that n+m must be less than or equal a total number of groups capable of connecting to the same aromatic ring.

Preferably, the polymerizable monomer containing aromatic fused ring structure includes

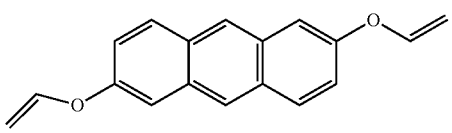

Specifically, the solvent includes one or more than one of N-methyl pyrrolidone (NMP), N-ethyl pyrrolidone, γ-caprolactone, dimethyl sulfoxide, and methylene chloride. Preferably, the solvent is N-methyl pyrrolidone.

Specifically, a mass percentage of the polyamic acid containing aromatic fused ring structure is 3-4%, a mass percentage of the polymerizable monomer containing aromatic fused ring structure is 0.03-0.4%, a mass percentage of the solvent is 95.6-96.97%.

Figure 1A:
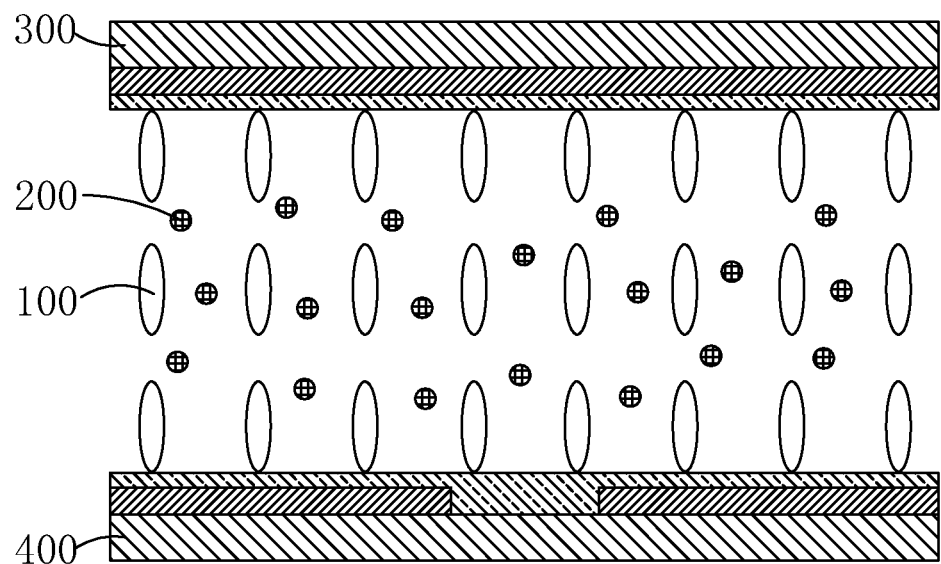
FIGS. 1A-1D schematically illustrate a process of current polymer vertical alignment technique.
Figure 1B:
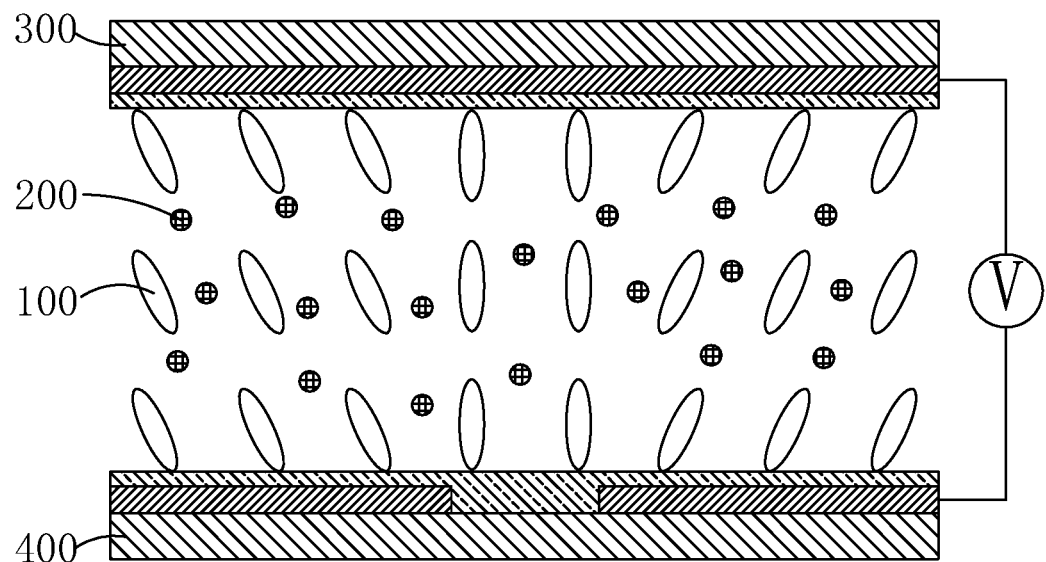
Figure 1C:
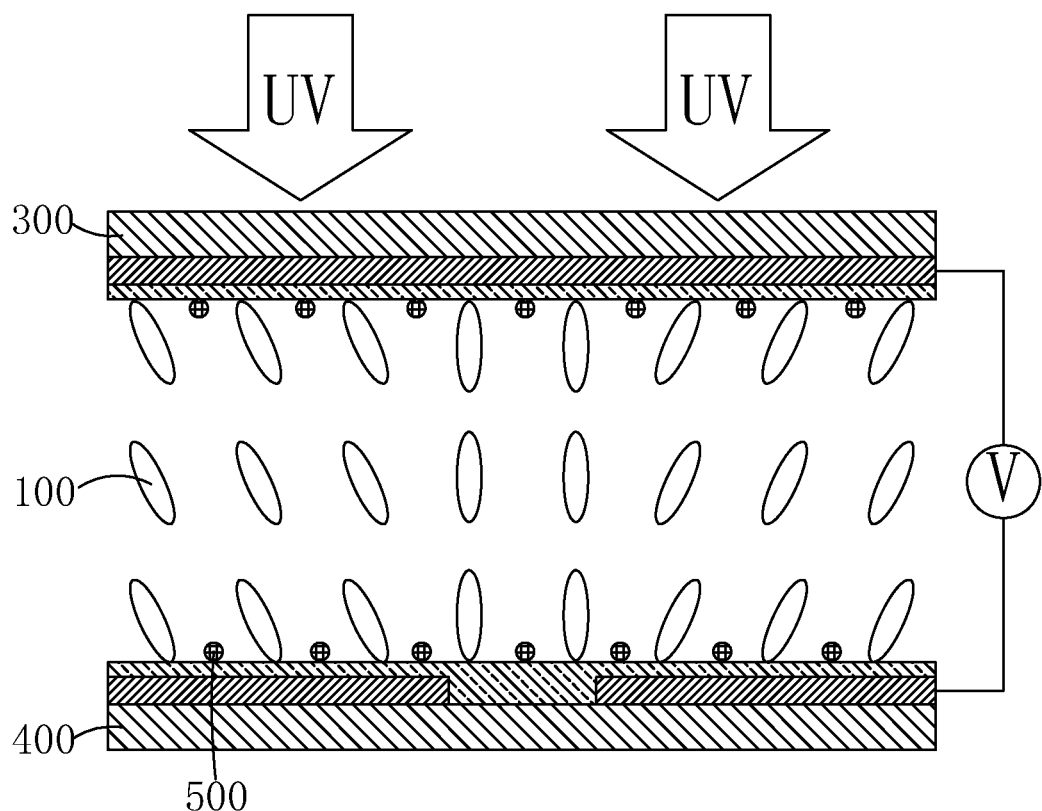
Figure 1D:
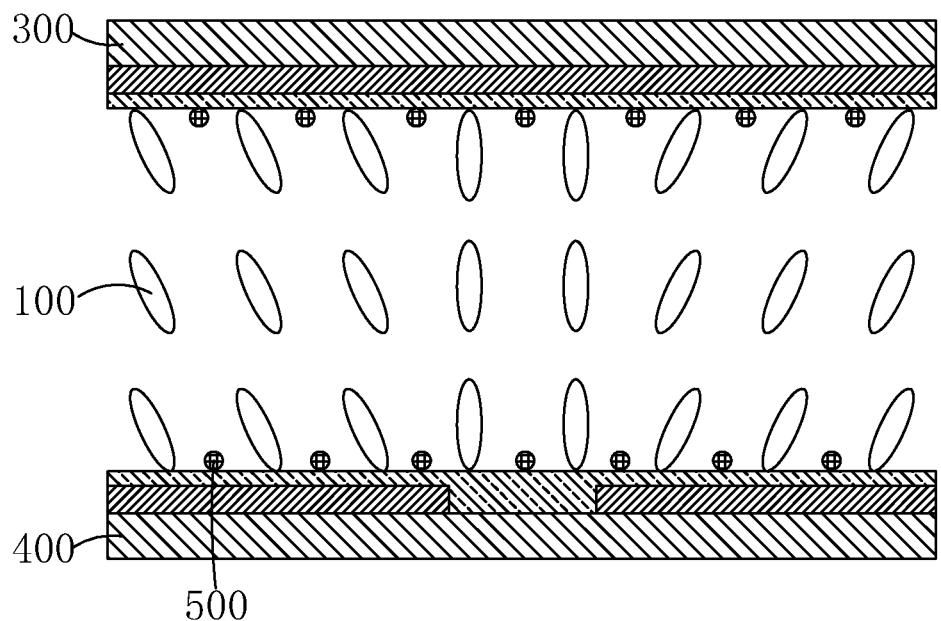
Figure 2:
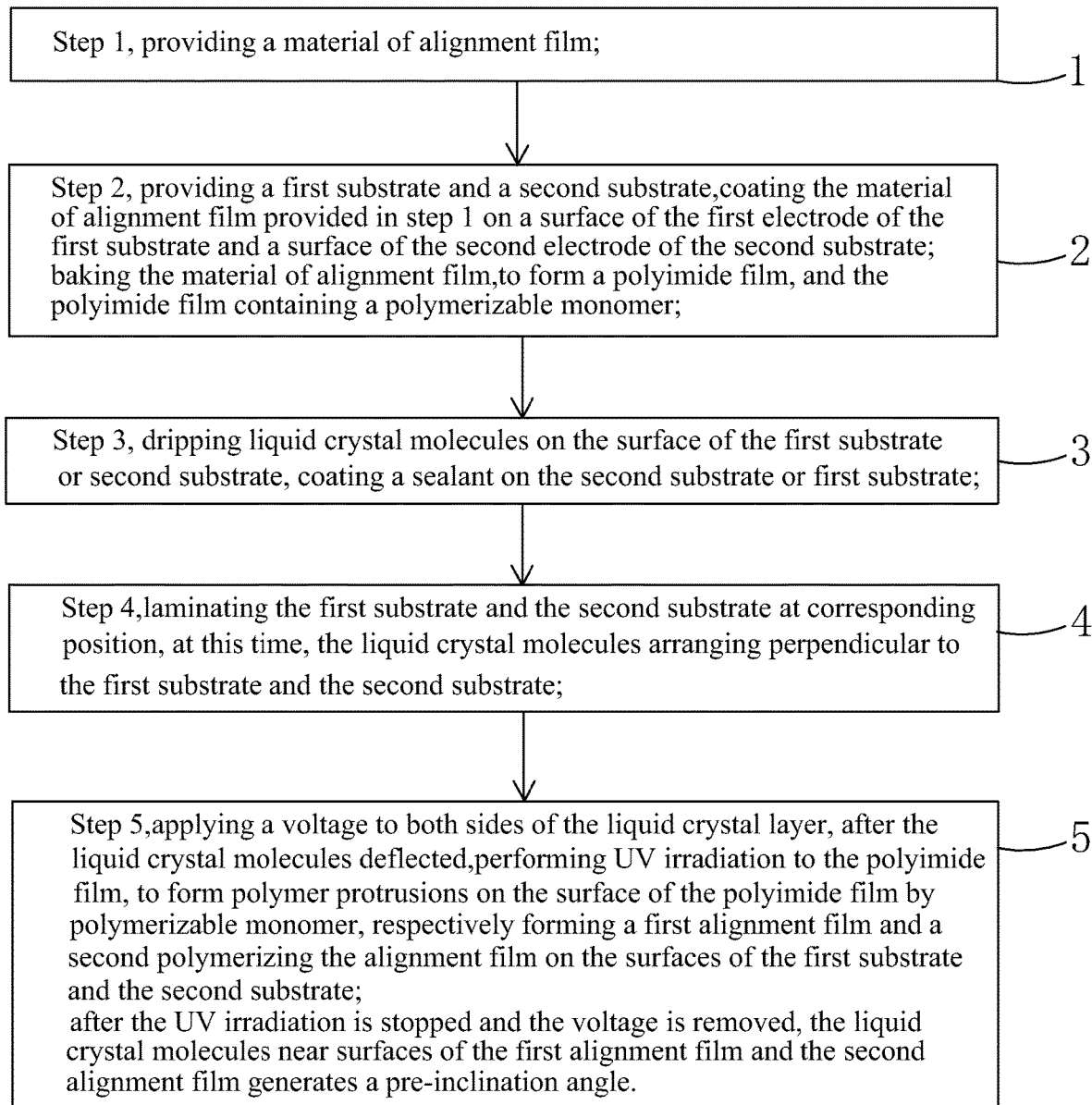
FIG. 2 is a flowchart of a method of fabricating a liquid crystal display panel of the present application.

Referring to FIG. 2, the present application provides a method of fabricating a liquid crystal display panel including following steps.

Step 1, providing a material of alignment film, the material of alignment film including a polyamic acid containing aromatic fused ring structure, a polymerizable monomer containing aromatic fused ring structure, and a solvent.

Specifically, the polyamic acid containing aromatic fused ring structure including one or more than one of the following:

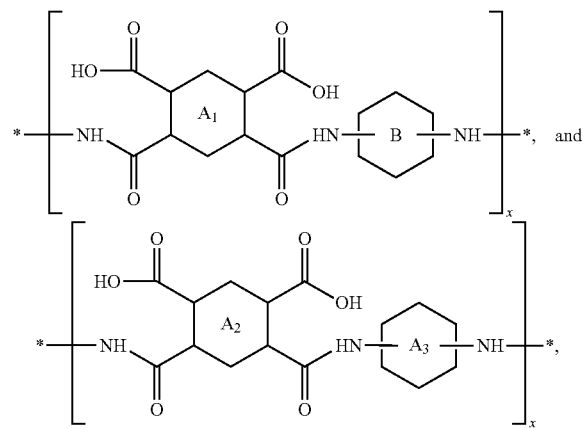

wherein x is 20-10000;
wherein

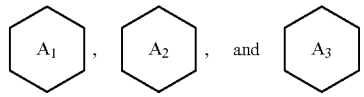

include one or a combination of more than one of

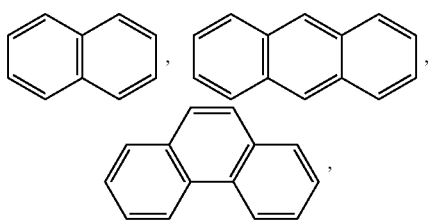

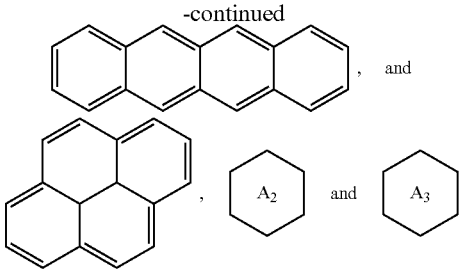

are the same or different;

is a non-aromatic fused ring based group containing cyclic unit.

Specifically, the cyclic unit includes one or more than one in five-membered ring and six-membered ring; the six-membered ring includes one or more than one in aromatic ring and aliphatic ring.

Preferably,

includes one or a combination of more than one of

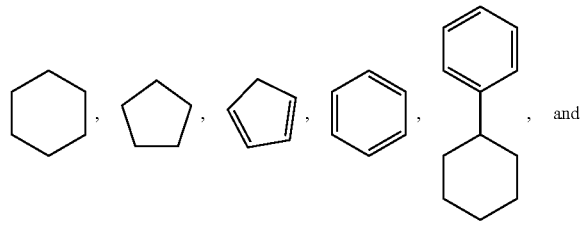

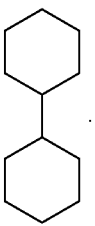

Specifically, the polymerizable monomer containing aromatic fused ring structure includes one or more than one in

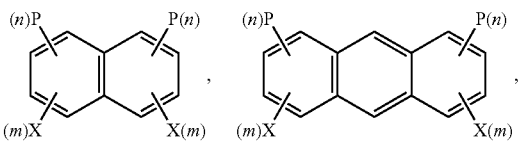

-continued

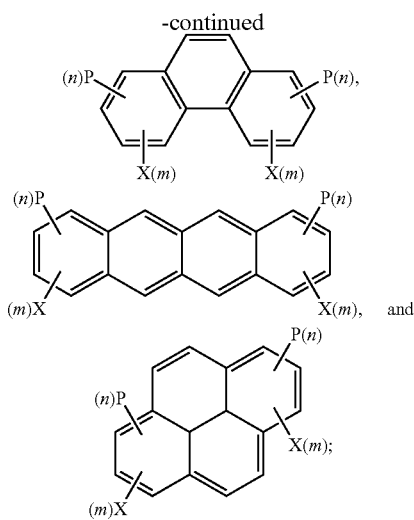

wherein P represents the polymerizable group, which is selected from at least one of methacrylate group, acrylate group, vinyl, ethyleneoxy, and epoxy; n is a number of the polymerizable group connecting to the same aromatic ring, n=1, 2 or 3, when n is greater than 1, the n polymerizable groups P are the same or different;

X represents a substituent, which is selected from at least one of —F, —Cl, —Br, methyl, —CN, straight or branched chain alkyl of 2-8 carbon atoms, and a group obtained by substituting one or more than one methyl in the alkyl with oxygen or sulfur atom; in is a number of the substituent X connecting to the same aromatic ring, m=1, 2 or 3, when in is greater than 1, the in substituents X are the same or different.

Specifically, in the material of alignment film, a mass percentage of the polyamic acid containing aromatic fused ring structure is 3-4%, a mass percentage of the polymerizable monomer containing aromatic fused ring structure is 0.03-0.4%, a mass percentage of the solvent is 95.6-96.97%.

Specifically, the method of preparing the material of alignment film provided in Step 1 includes:

Step 11, providing a dianhydride based monomer containing aromatic fused ring structure and a diamine based monomer, dissolving the dianhydride based monomer containing aromatic fused ring structure and the diamine based monomer in the solvent, reacting to obtain the polyamic acid containing aromatic fused ring structure, so as to obtain a polyamic acid solution.

Specifically, in Step 11, the dianhydride based monomer containing aromatic fused ring structure and the diamine based monomer are dissolved in the solvent according a molar ratio of 1:1. Specifically, Step 11 is performed at room temperature, a reaction is 20-30 hours, preferable 24 hours.

Specifically, a structural formula of the dianhydride based monomer containing aromatic fused ring structure is

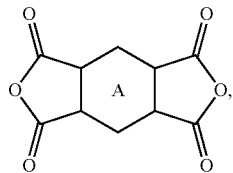

wherein

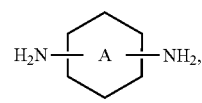

includes one or a combination of more than one of

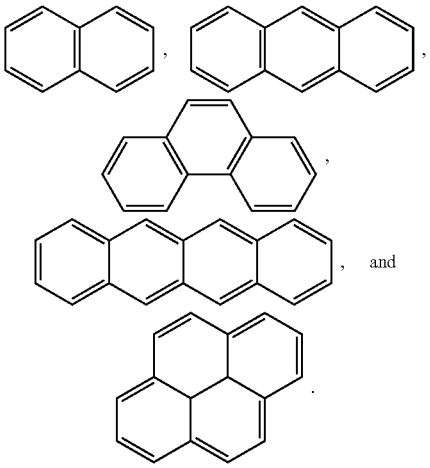

Preferably, the dianhydride based monomer containing aromatic fused ring structure is

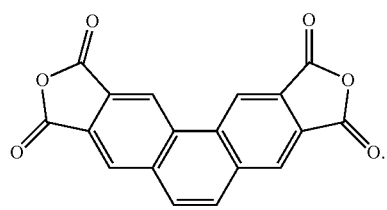 [SMILES: O=c1oc(=O)c2cc3c(ccc4cc5c(=O)oc(=O)c5cc43)cc12]

Specifically, the diamine based monomer includes at least one of a diamine based monomer containing aromatic fused ring structure, and a diamine based monomer not containing aromatic fused ring structure.

Specifically, a structural formula of the diamine based monomer containing aromatic fused ring structure is $$H_2N-A-NH_2,$$

wherein

includes one or a combination of more than one of

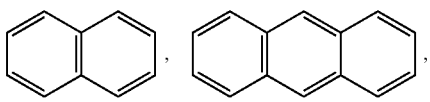

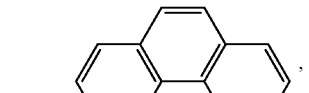

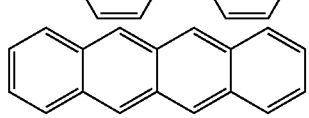, and

Preferably, the diamine based monomer containing aromatic fused ring structure is

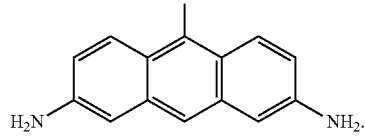

Specifically, a structural formula of the diamine based monomer not containing aromatic fused ring structure is

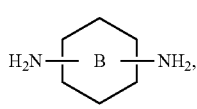

wherein

is non-aromatic fused ring based group containing cyclic unit.

Specifically, the cyclic unit includes one or more than one in five-membered ring and six-membered ring; the six-membered ring includes one or more than one in aromatic ring and aliphatic ring.

Preferably,

includes one or a combination of more than one of

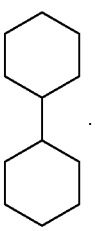, , and

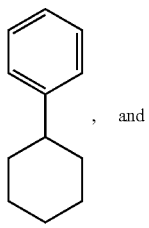

Specifically, a reaction formula that the diamine based monomer containing aromatic fused ring structure

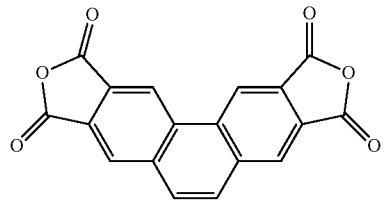 [SMILES: O=c1oc(=O)c2cc3c(ccc4cc5c(=O)oc(=O)c5cc43)cc12]

and the diamine based monomer containing aromatic fused ring structure

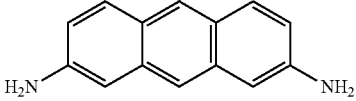

occur the reaction of forming the polyamic acid containing aromatic fused ring structure is:

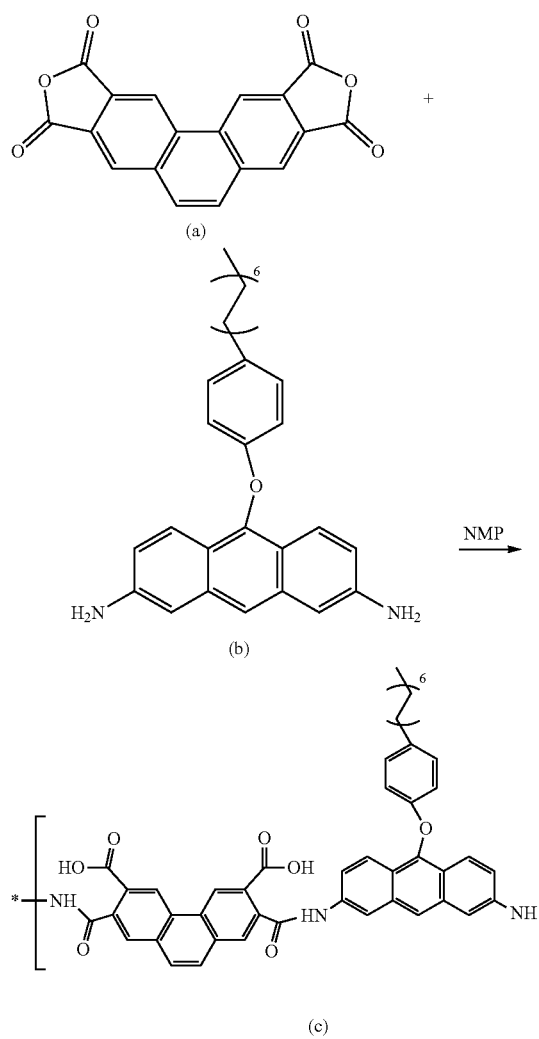

Specifically, the solvent includes one or more than one of N-methyl pyrrolidone (NMP), N-ethyl pyrrolidone, γ-caprolactone, dimethyl sulfoxide, and methylene chloride. Preferably, the solvent is N-methyl pyrrolidone.

Step 12, providing a polymerizable monomer containing aromatic fused ring structure, adding the polymerizable monomer containing aromatic fused ring structure into the polyamic acid solution obtained in Step 11, to obtain the material of alignment film.

Specifically, in Step 12, the polymerizable monomer containing aromatic fused ring structure is added in the polyamic acid solution according to a ratio of 0.5-10% that is a molar ratio of the polymerizable monomer containing aromatic fused ring structure to the dianhydride based monomer containing aromatic fused ring structure or the diamine based monomer added in step 11.

Specifically, the polymerizable monomer containing aromatic fused ring structure includes one or more than one of the following:

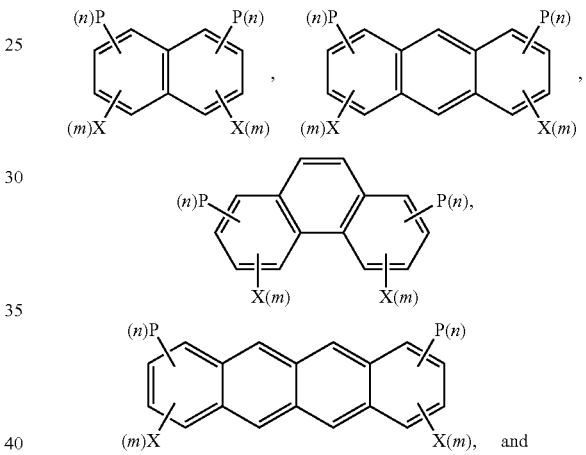

the polyamic acid containing aromatic fused ring structure obtained by the aforesaid reaction is

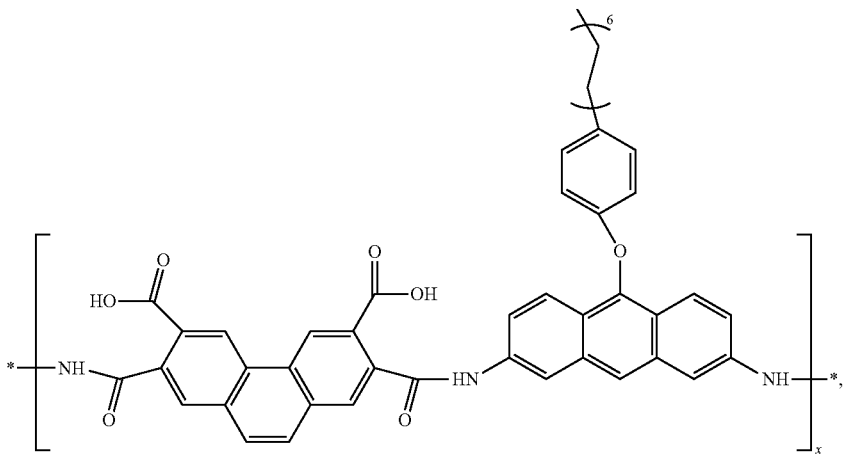

wherein x is 20-10000.

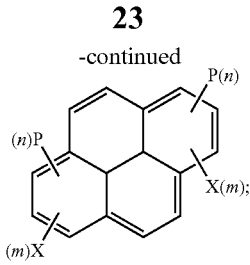

wherein P represents the polymerizable group, which is selected from at least one of methacrylate group, acrylate group, vinyl, ethyleneoxy, and epoxy; n is a number of the polymerizable group connecting to the same aromatic ring, n=1, 2 or 3, when n is greater than 1, the n polymerizable groups P are the same or different;

X represents a substituent, which is selected from at least one of —F, —Cl, —Br, methyl, —CN, straight or branched chain alkyl of 2-8 carbon atoms, and a group obtained by substituting one or more than one methyl in the alkyl with oxygen or sulfur atom; in is a number of the substituent X connecting to the same aromatic ring, m=1, 2 or 3, when m is greater than 1, the in substituents X are the same or different.

Preferably, the polymerizable monomer containing aromatic fused ring structure includes

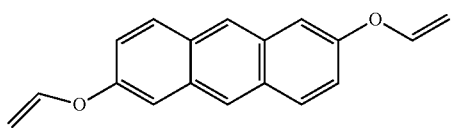

In comparison with the methylacrylate based polymerizable monomer containing benzene ring selected by the conventional vertical alignment technique, the polymerizable monomer containing aromatic fused ring structure selected by the present application has stronger heat resistance and light reaction ability.

Figure 3:
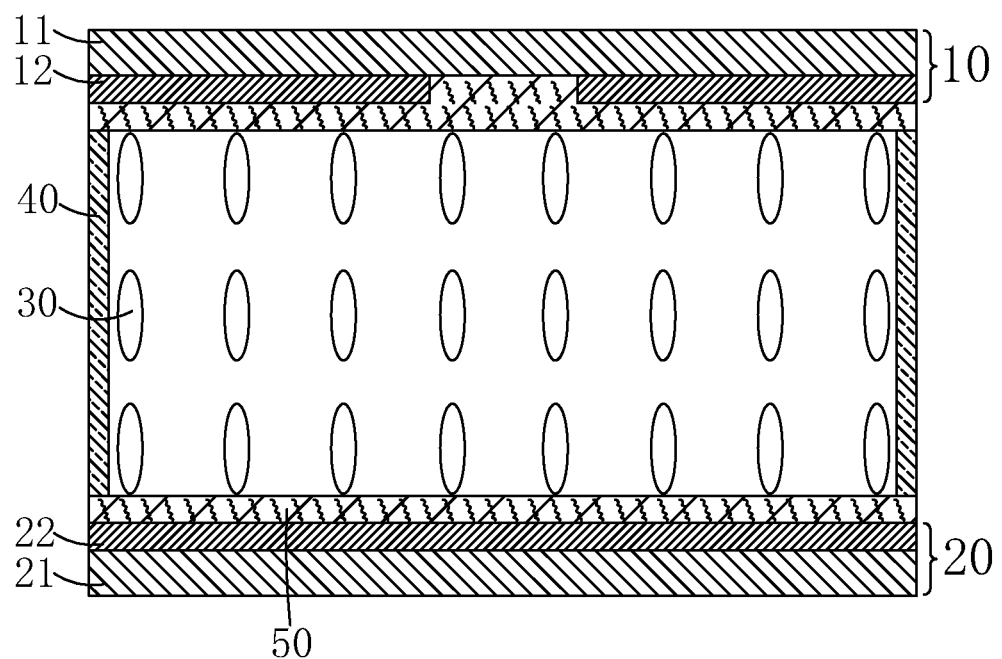
FIG. 3 schematically illustrates Steps 2-4 of the method of fabricating the liquid crystal display panel of the present application.

Step 2, referring to FIG. 3, providing a first substrate 10 and a second substrate 20, the first substrate 10 including a first underlying substrate 11 and a first electrode 12 disposed on the first underlying substrate 11, the second substrate 20 including a second underlying substrate 21 and a second electrode 22 disposed on the second underlying substrate 21;

coating the material of alignment film provided in step 1 on a surface of the first electrode 12 of the first substrate 10 and a surface of the second electrode 22 of the second substrate 20;

baking the material of alignment film, to completely volatilize the solvent, simultaneously to make dehydration and cyclization of the polyamic acid containing aromatic fused ring structure, then to be converted to a polyimide containing aromatic fused ring, to form a polyimide film 50, and the polyimide film 50 containing a polymerizable monomer containing aromatic fused ring structure.

Specifically, in Step 2, baking the material of alignment film is performed under a temperature condition of 180-200° C.; a baking time is 20 min-60 min, preferably is 30 min.

Specifically, the polyimide containing aromatic fused ring structure obtained in Step 2 includes including one or more than one of the following:

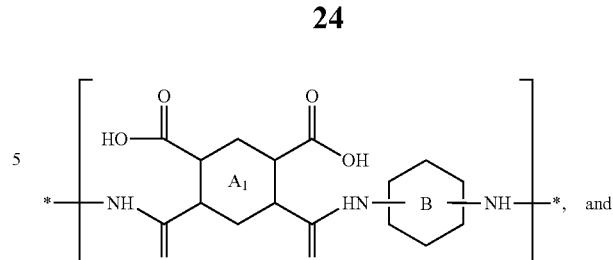

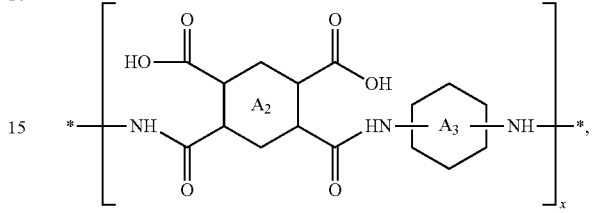

wherein x is 20-10000;
wherein

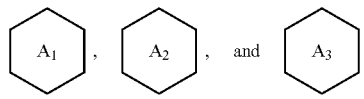

include one or a combination of more than one of

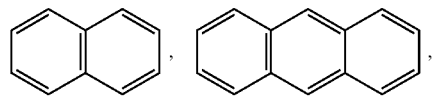

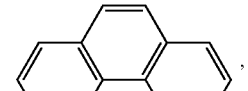

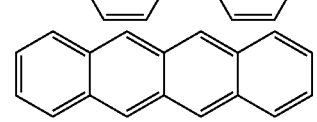

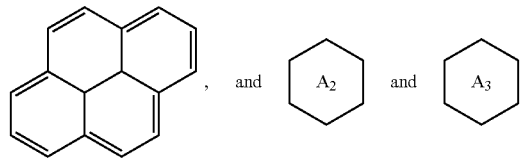

are the same or different;

is a non-aromatic fused ring based group containing cyclic unit.

Specifically, the cyclic unit includes one or more than one in five-membered ring and six-membered ring; the six-membered ring includes one or more than one in aromatic ring and aliphatic ring.

Preferably, 
includes one or a combination of more than one of
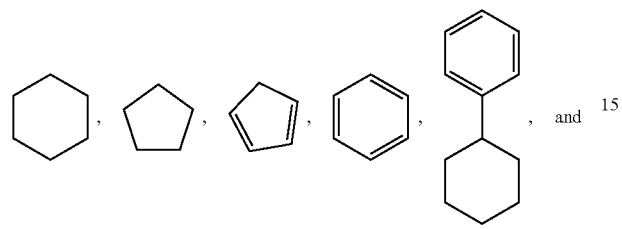
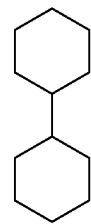
Preferably, a reaction formula of dehydrating and converting the polyamic acid containing aromatic fused ring structure
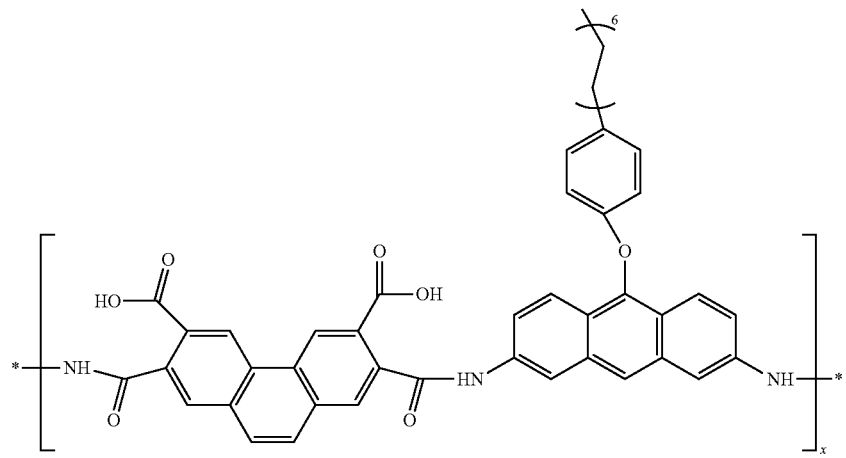
to a polyimide containing aromatic fused ring is:
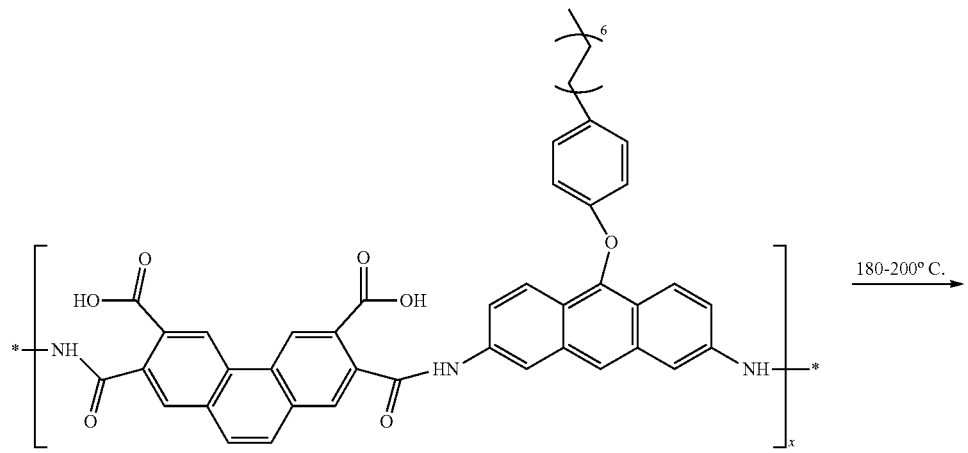

-continued

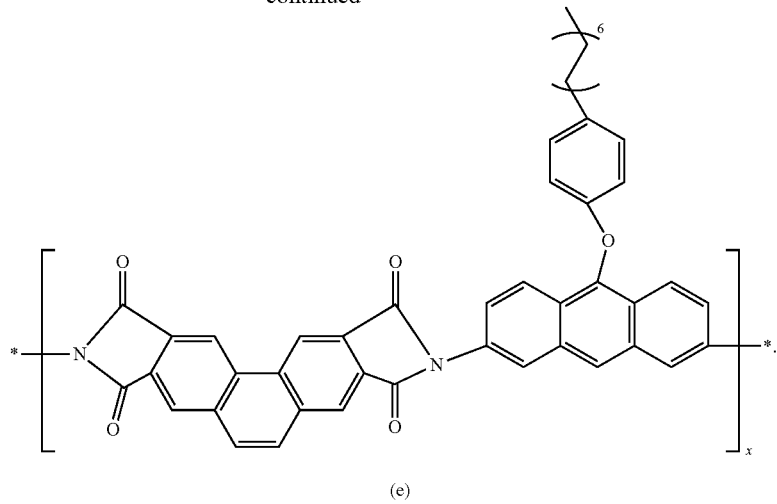

(e)

The polyimide containing aromatic fused ring structure obtained by the aforesaid reaction is

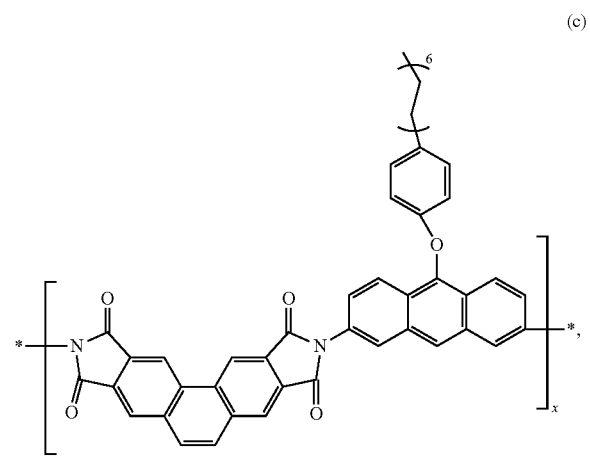

(c)

wherein x is 20-10000.

By introducing the group A containing aromatic fused ring structure in the polyimide, light absorbing ability of the polyimide film 50 can be strengthened, ability of controlling the polymerizable monomer is increased, and heat resistance of the polyimide film 50 is also increased.

Due polarity of the polyimide containing aromatic fused ring structure is stronger than polarity of the polymerizable monomer containing aromatic fused ring structure, the two will produce phase separation, the polymerizable monomer containing aromatic fused ring structure tends to concentrate on the surface of the polyimide film 50.

Step 3, referring to FIG. 3, dripping liquid crystal molecules on the surface of the first substrate 10 or second substrate 20 that the polyimide film 50 is disposed thereon, coating a sealant 40 on a periphery corresponding to the liquid crystal molecules on the side of the second substrate 20 or first substrate 10 that the polyimide film 50 is disposed thereon.

Preferably, Step 3 further includes coating a conductive adhesive on a periphery corresponding to the sealant 40 on the side of the second substrate 20 or first substrate 10.

Step 4, referring to FIG. 3, laminating the first substrate 10 and the second substrate 20 at corresponding position, so that a liquid crystal layer 30 is formed by the liquid crystal molecules located between the first substrate 10 and the second substrate 20; curing the sealant 40, at this time, the liquid crystal molecules arranging perpendicular to the first substrate 10 and the second substrate 20.

Specifically, in Step 4, laminating the first substrate 10 and the second substrate 20 at corresponding position is performed under a vacuum environment.

Specifically, in Step 4, the method of curing the sealant 40 includes one or more than one of thermal curing or UV curing.

Figure 4:
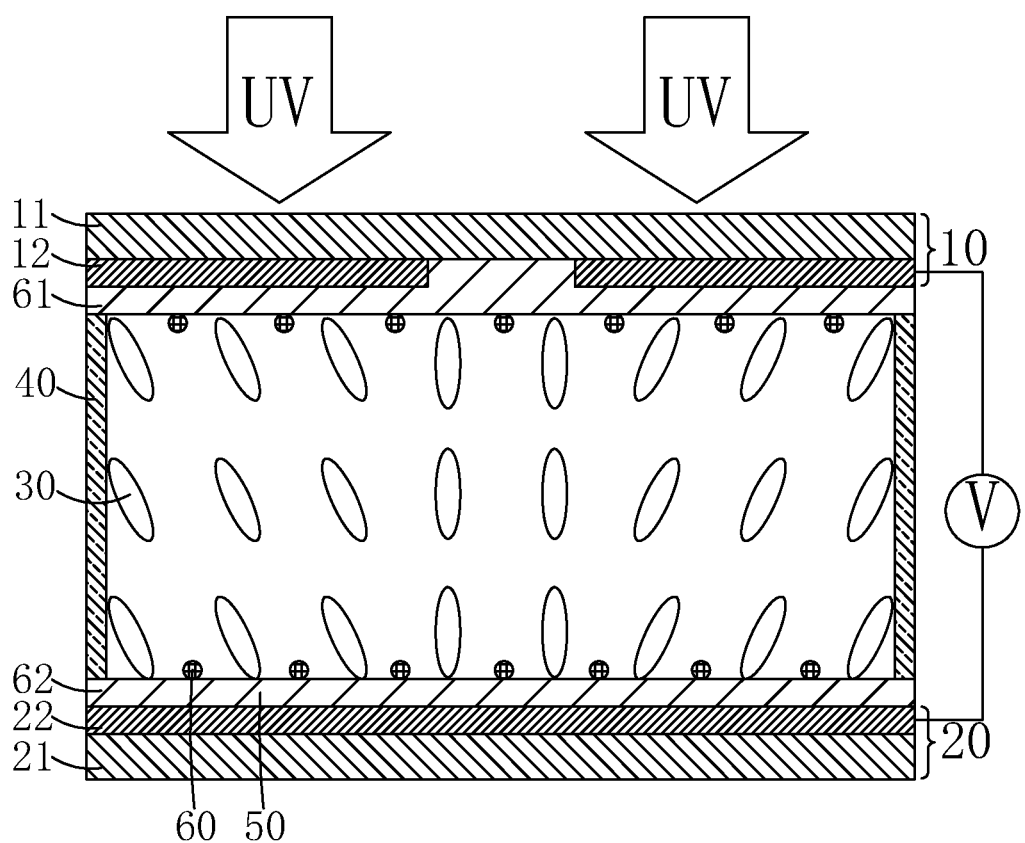
FIGS. 4-5 schematically illustrate Step 5 of the method of fabricating the liquid crystal display panel of the present application, and FIG. 5 schematically illustrates a structure of a liquid crystal display panel of the present application.
Figure 5:
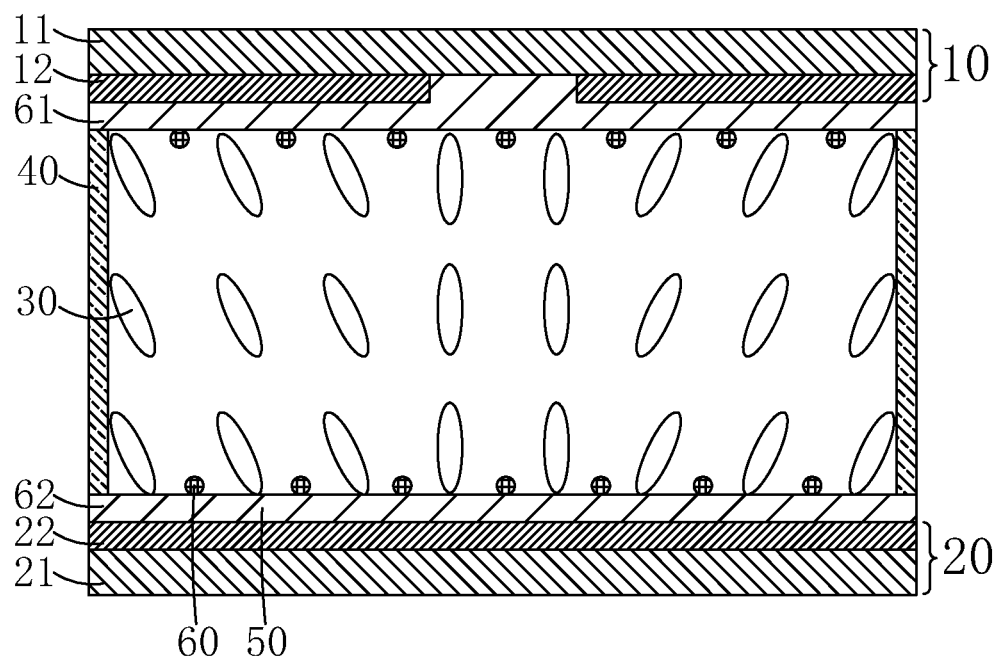

Step 5, referring to FIGS. 4-5, applying a voltage to both sides of the liquid crystal layer 30 through the first electrode 12 and the second electrode 22, after the liquid crystal molecules deflected, at the same time of applying the voltage, performing UV irradiation to the polyimide film 50, to form polymer protrusions 60 on the surface of the polyimide film 50 by polymerizing the polymerizable monomer containing aromatic fused ring structure by action of photo initiation, so that a first alignment film 61 and a second alignment film 62 are respectively formed on the surfaces of the first substrate 10 and the second substrate 20, both the first alignment film 61 and the second alignment film 62 include the polyimide film 50 and the polymer protrusions 60 located on the surface of the polyimide film 50;

wherein after the UV irradiation is stopped and the voltage is removed, the liquid crystal molecules near surfaces of the first alignment film 61 and the second alignment film 62 generates a pre-inclination angle.

Specifically, in Step 5, the polymer protrusions 60 play a role of maintaining the deflection angle of the liquid crystal molecules on the surfaces of the first alignment film 61 and the second alignment film 62.

Specifically, in Step 5, the voltage applied to the both sides of the liquid crystal layer 30 is 13-25V, an intensity of ultraviolet (UV) during the UV irradiation is 85-100 mW/cm$^2$, an irradiation time is 20-30 min.

Specifically, in Step 5, the pre-inclination angle of the liquid crystal molecules is 0.5°-2°.

In the method of fabricating the liquid crystal display panel of the present application, a material of alignment film is obtained by mixing a polymerizable monomer in polyamic acid solution, a polyimide film containing polymerizable monomer containing aromatic fused ring structure is obtained by coating and baking the material of alignment film on a substrate, after UV irradiates the polyimide film, polymer protrusions on the polyimide film are formed by polymerizing the polymerizable monomer, the liquid crystal molecules generate the pre-inclination angle under coordination of the voltage, so as to achieve alignment effect, in comparison with polymer vertical alignment technique, the present application does not need to mix polymerizable monomer in liquid crystal molecules, the residual polymerizable monomer contaminating the liquid crystal molecules after the UV reaction can be obviated, and quality of the liquid crystal display panel is enhanced.

Referring to FIG. 5, based on the aforesaid method of fabricating the liquid crystal display panel, the present application further provides a liquid crystal display panel including: oppositely disposed a first substrate 10 and a second substrate 20, a liquid crystal layer 30 disposed between the first substrate 10 and the second substrate 20, a first alignment film 61 disposed on the first substrate 10 near a side of the liquid crystal layer 30, and a second alignment 62 film disposed on the second substrate 20 near a side of the liquid crystal layer 30;

both the first alignment film 61 and the second alignment film 62 including a polyimide film 50 and polymer protrusions 60 located on a surface of the polyimide film 50;

a material of the polyimide film including a polyimide containing aromatic fused ring structure, the polyimide containing aromatic fused ring structure including one or more than one of the following:

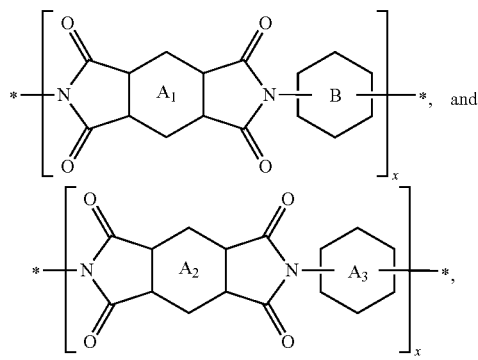

wherein x is 20-10000;
wherein

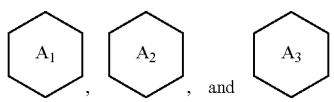

include one or a combination of more than one of

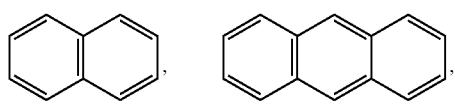

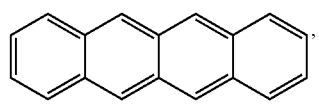

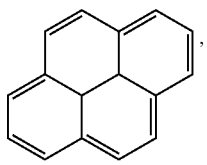, and  and 

are the same or different;

is a non-aromatic fused ring based group containing cyclic unit.

Specifically, the cyclic unit includes one or more than one in five-membered ring and six-membered ring; the six-membered ring includes one or more than one in aromatic ring and aliphatic ring.

Preferably,

includes one or a combination of more than one of

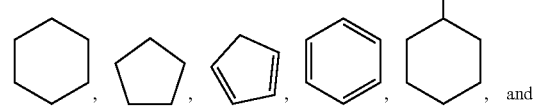

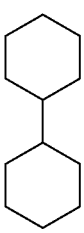

Preferably, the polyimide containing aromatic fused ring structure includes (c)

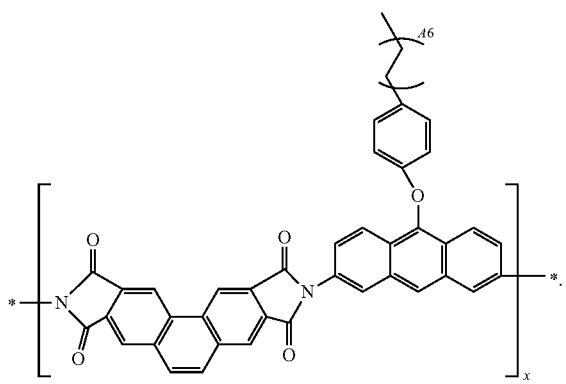

By introducing the group

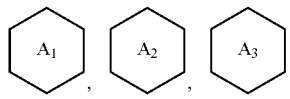

containing aromatic fused ring structure in the polyimide, light absorbing ability of the polyimide film 50 can be strengthened, ability of controlling the polymerizable monomer is increased, and heat resistance of the polyimide film 50 is also increased.

The polymer protrusions are formed by polymerizing the polymerizable monomer containing aromatic fused ring structure, the polymerizable monomer containing aromatic fused ring structure includes one or more than one of the following:

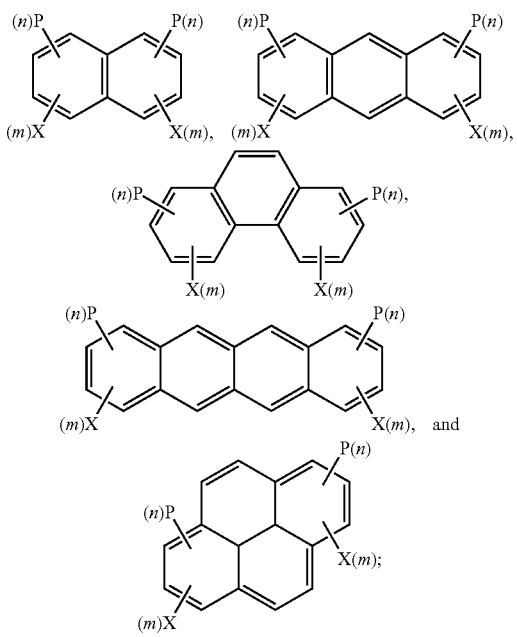

P represents a polymerizable group, which is selected from at least one of methacrylate group, acrylate group, vinyl, ethyleneoxy, and epoxy; n is a number of the polymerizable P connecting to the same aromatic ring, n=1, 2, or 3, when n is greater than 1, the n polymerizable groups P are the same or different;

X represents a substituent, which is selected from at least one of —F, —Cl, —Br, methyl, —CN, straight or branched chain alkyl of 2-8 carbon atoms, and a group obtained by substituting one or more than one methyl in the alkyl with oxygen or sulfur atom; in is a number of the substituent X connecting to the same aromatic ring, m=1, 2 or 3, when in is greater than 1, the in substituents X are the same or different.

Preferably, the polymerizable monomer containing aromatic fused ring structue includes

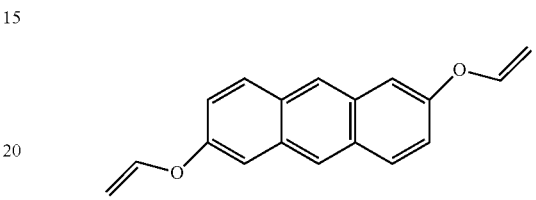

By introducing the aromatic fused ring structure in the polymerizable monomer, heat resistance of the polymerizable monomer can be enhanced; simultaneously, light reaction ability of the polymerizable is increased.

Specifically, the first substrate 10 includes a first underlying substrate 11 and a first electrode 12 disposed between the first underlying substrate 11 and the first alignment film 61, the second substrate 20 includes a second underlying substrate 21 and a second electrode 22 disposed between the second underlying substrate 21 and the second alignment film 62.

Specifically, the liquid crystal display panel further includes a sealant 40 disposed between the first substrate 10 and the second substrate 20, and located on a periphery of the liquid crystal layer 30.

Preferably, the liquid crystal display panel further includes a conductive adhesive disposed between the first substrate 10 and the second substrate 20, and located on a periphery of the sealant 40.

The liquid crystal display panel of the present application has a simple structure and good alignment effect, and has excellent display quality.

In summary, the present application provides a material of alignment film, a method of fabricating a liquid crystal display panel, and a liquid crystal display panel. The material of alignment film of the present application is obtained by mixing a polymerizable monomer in the polyamic acid solution, thus is easy to fabricate. The method of fabricating the liquid crystal display panel of the present application obtains an alignment film including a polyimide film and polymer protrusions located on a surface of the polyimide film by coating the material of alignment film on a substrate, and going through a series of processes; the alignment film can allow liquid crystal molecules arrange in vertical alignment and generate a pre-inclination angle, and a risk of the polymerizable monomer contaminating the liquid crystal molecules does not exist, so as to enhance quality of the liquid crystal display panel. The liquid crystal display panel of the present application has a simple structure and good alignment effect, and has excellent display quality.

Based on the above description, an ordinarily skilled in the art can complete various similar modifications and arrangements according to the technical programs and ideas of the present application, and the scope of the appended claims of the present application should encompass all such modifications and arrangements.

What is claimed is:

1. A liquid crystal display panel, comprising: oppositely disposed a first substrate and a second substrate, a liquid crystal layer disposed between the first substrate and the second substrate, a first alignment film disposed on the first substrate near a side of the liquid crystal layer, and a second alignment film disposed on the second substrate near a side of the liquid crystal layer;

both the first alignment film and the second alignment film comprising a polyimide film and polymer protrusions located on a surface of the polyimide film;

a material of the polyimide film comprising a polyimide containing aromatic fused ring structure, the polyimide containing aromatic fused ring structure comprising one or more than one of the following:

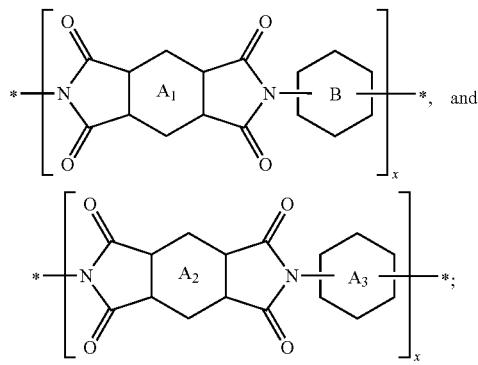

wherein

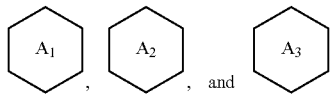

comprise one or a combination of more than one of

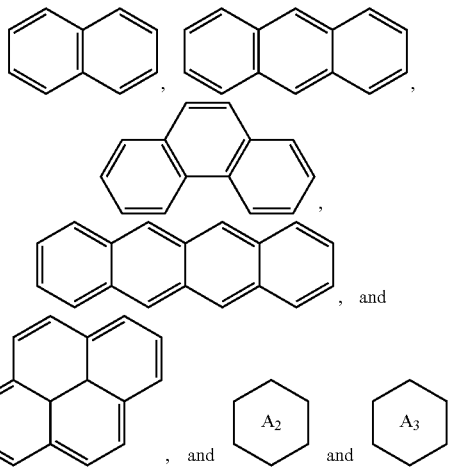

are the same or different;

is a non-aromatic fused ring based group containing cyclic unit; and the polymer protrusions are formed by polymerizing a polymerizable monomer containing aromatic fused ring structure, the polymerizable monomer containing aromatic fused ring structure comprises

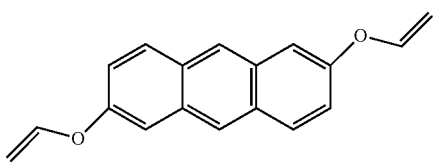

* * * * *